(12) United States Patent
Sone

(10) Patent No.: US 7,636,175 B2
(45) Date of Patent: Dec. 22, 2009

(54) IMAGE FORMING APPARATUS ENSURING ERASING OPERATION

(75) Inventor: Masaki Sone, Neyagawa (JP)

(73) Assignee: Kyocera Mita Corporation, Osaka (JP)

( * ) Notice: Subject to any disclaimer, the term of this patent is extended or adjusted under 35 U.S.C. 154(b) by 793 days.

(21) Appl. No.: 11/339,962

(22) Filed: Jan. 26, 2006

(65) Prior Publication Data
US 2006/0164449 A1    Jul. 27, 2006

(30) Foreign Application Priority Data
Jan. 26, 2005    (JP) ............................... 2005-018397

(51) Int. Cl.
G06F 15/00    (2006.01)
G06K 15/00    (2006.01)

(52) U.S. Cl. ................... 358/1.16; 358/1.14; 358/1.15; 711/166; 711/173

(58) Field of Classification Search ................ 358/1.15, 358/1.16, 1.14; 707/204; 711/166, 173
See application file for complete search history.

(56) References Cited

U.S. PATENT DOCUMENTS

| 7,050,183 | B2 * | 5/2006 | Isshiki ..................... 358/1.14 |
| 2005/0065987 | A1 * | 3/2005 | Telkowski et al. ........... 707/204 |
| 2005/0206694 | A1 * | 9/2005 | Wadley ..................... 347/85 |
| 2006/0010160 | A1 * | 1/2006 | Kishi et al. ................ 707/102 |

FOREIGN PATENT DOCUMENTS

| JP | 2004104581 | 4/2004 |
| JP | 2004214954 | 7/2004 |

* cited by examiner

*Primary Examiner*—Chan S Park
(74) *Attorney, Agent, or Firm*—Ditthavong Mori & Steiner, P.C.

(57) ABSTRACT

It is determined whether management information exists in an erasure folder or not after a power of an image forming apparatus is turned on. When the management information exists, image data is erased based on information of the management information. Then, it is determined whether the power is turned off or not during the erasing operation, and when it is determined that the power is turned off, the erasing operation of the image data is stopped and the management information remains in the erasure folder, but when it is determined that the power is not turned off, the erasing operation of the image data is completed.

5 Claims, 3 Drawing Sheets

IMAGE FORMING APPARATUS ENSURING ERASING OPERATION

BACKGROUND OF THE INVENTION

1. Field of the Invention

The present invention relates to an image forming apparatus and more particularly, it relates to an image forming apparatus such as a multi functional printer which has a storage unit for storing image data and functions to form an image based on the image data stored in the storage unit.

2. Description of the Background Art

A method of erasing image data stored in a storage unit in a conventional image processing apparatus is disclosed in Japanese Unexamined Patent Publication No. 2004-214954, for example.

According to the Japanese Unexamined Patent Publication No. 2004-214954, an image processing method is disclosed in which an erasing operation is performed only in a FAT (File Allocation Table: file management information) and the image data is processed according to a degree of secrecy.

According to the Japanese Unexamined Patent Publication No. 2004-214954, since the processed image data remains in a storage unit of the image processing apparatus, the image data could be reproduced by restoring.

As a method to solve the above problem, Japanese Unexamined Patent Publication No. 2004-104581, for example, discloses an image forming apparatus in which image data is usually stored in a nonvolatile storage unit and the image data is stored in a volatile storage unit according to need. An erasing operation of the image data stored in the volatile storage unit is easy and it can be completed in a short time as compared with the nonvolatile storage unit. Furthermore, when power of the image forming apparatus is cut off, since contents of the volatile storage unit are erased, the image data does not remain in the image forming apparatus.

According to the Japanese Unexamined Patent Publication No. 2004-104581, it is necessary to erase the image data stored in the nonvolatile storage unit. Here, when the power of the image forming apparatus is cut off during its erasing operation, the erasing operation is not completed and the image data remains in the image forming apparatus.

In addition, since the volatile storage unit is expensive in general, when a high-capacity volatile storage unit is used for a normal image data storage, its cost becomes high.

SUMMARY OF THE INVENTION

It is an object of the present invention to provide an image forming apparatus in which a nonvolatile storage unit is used and even when power of the image forming apparatus is cut off during an erasing operation, image data can be surely erased.

An image forming apparatus according to the present invention is an image forming apparatus having nonvolatile storing unit for storing image data and forming an image based on the image data stored in the storing unit, which comprises an erasure folder retaining management information which specifies erasable image data among the image data stored in the storing unit, a moving unit for moving the management information to the erasure folder, an erasing unit for erasing the erasable image data based on the management information, a power supply detecting unit for detecting on/off of a power supply of the image forming apparatus, a determining unit for determining whether the management information exists in the erasure folder or not when the power supply detecting unit detects that the power is turned on, and a control unit for activating the erasing unit when it is determined that the management information exists in the erasure folder by the determining unit.

According to the image forming apparatus in the present invention, when it is detected that the power is turned on, if the management information which specifies erasable image data exists in the erasure folder, the image data is erased based on the management information. Thus, even when the power of the image forming apparatus is turned off during the erasing operation, the image data can be surely erased while the nonvolatile storage unit is used.

Preferably, the control unit erases the management information from the erasure folder when the erasing unit erases the erasable image data.

Preferably, the moving unit moves the management information to the erasure folder at a predetermined timing.

Still preferably, the predetermined timing can be set by a user.

DESCRIPTION OF THE PREFERRED EMBODIMENTS

Figure 1:
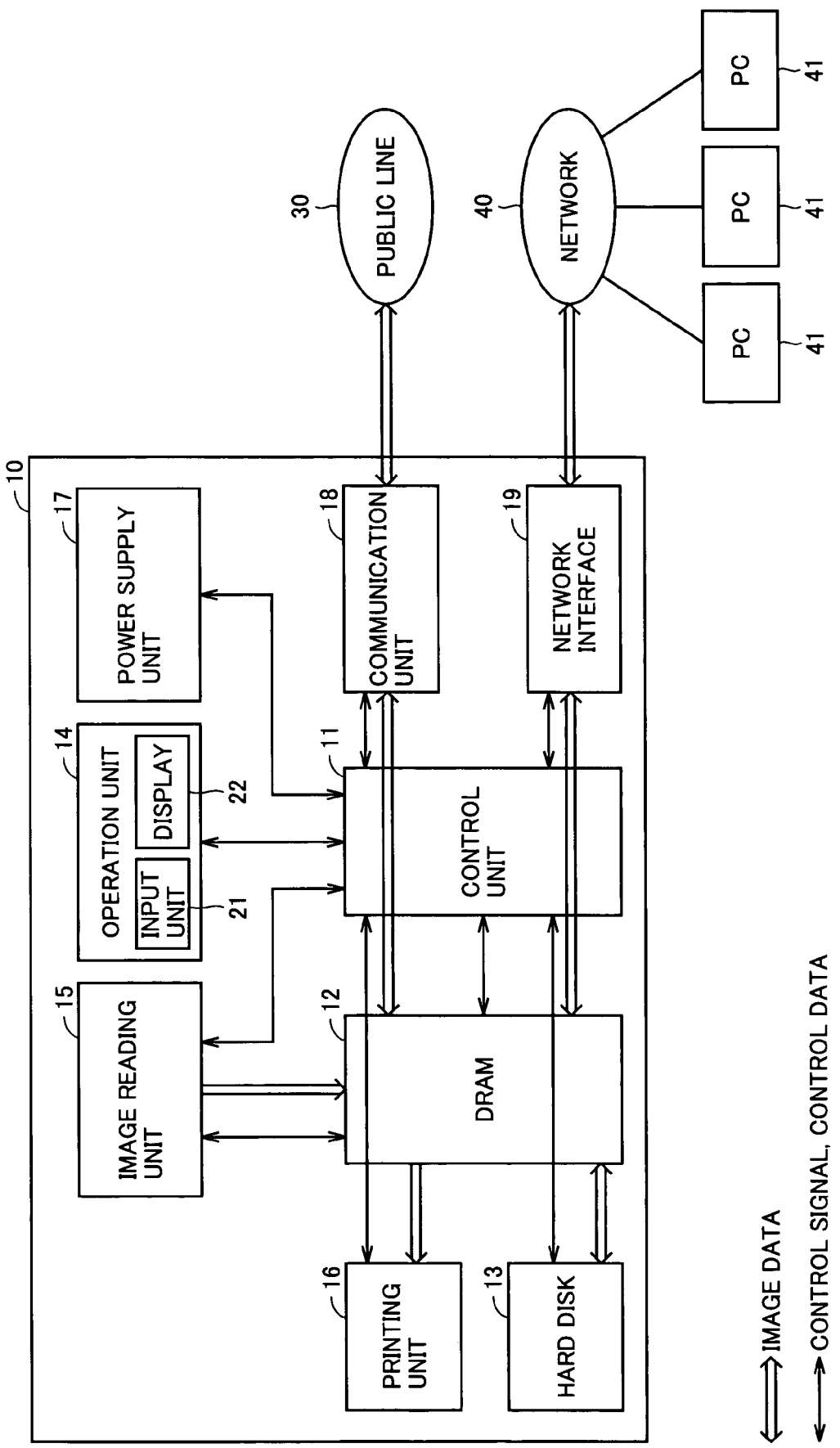
FIG. 1 is a block diagram showing a constitution of an image forming apparatus according to one embodiment of the present invention.

Embodiments of the present invention will be described with reference to the drawings hereinafter. FIG. 1 is a block diagram showing a constitution of a multi functional printer 10 when an image forming apparatus according to one embodiment of the present invention is applied to a multi functional printer. Referring to FIG. 1, the multi functional printer 10 comprises a control unit 11 for controlling the entire multi functional printer 10, a DRAM 12, a hard disk 13, an operation unit 14, an image reading unit 15, a printing unit 16, a power supply unit 17, a FAX communication unit 18 connected a public line 30, and a network IF (interface) 19 connected to a network 40.

The multi functional printer 10 functions as a copying machine in such a manner that it forms an image by the printing unit 16 through the DRAM 12 using image data read by the image reading unit 15. The multi functional printer 10 functions as a facsimile machine in such a manner that it forms an image by the printing unit 16 through the DRAM 12 using image data transmitted from the public line 30 through the FAX communication unit 18. Furthermore, the multi functional printer 10 functions as a printer in such a manner that it forms an image by the printing unit 16 through the DRAM 12 using image data transmitted from a personal computer 41 connected to the network 40 through the network IF 19. In any case, the multi functional printer 10 stores the transmitted image data and the image data read out by the image reading unit 15 in the hard disk 13 through the DRAM 12. The hard disk 13 is a nonvolatile storing unit.

The operation unit 14 comprises an input unit 21 and a display 22. With the input unit 21, a user inputs information of an image or information such as the number of copies to form various kinds of images. The display 22 displays various kinds of set information such as image information or information of the number of copies. The power supply unit 17 can detect on/off of a power supply and transmits the detected data to the control unit 11.

Thick arrows show image data flows and thin arrows show control signal flows or control data flows.

Figure 2:
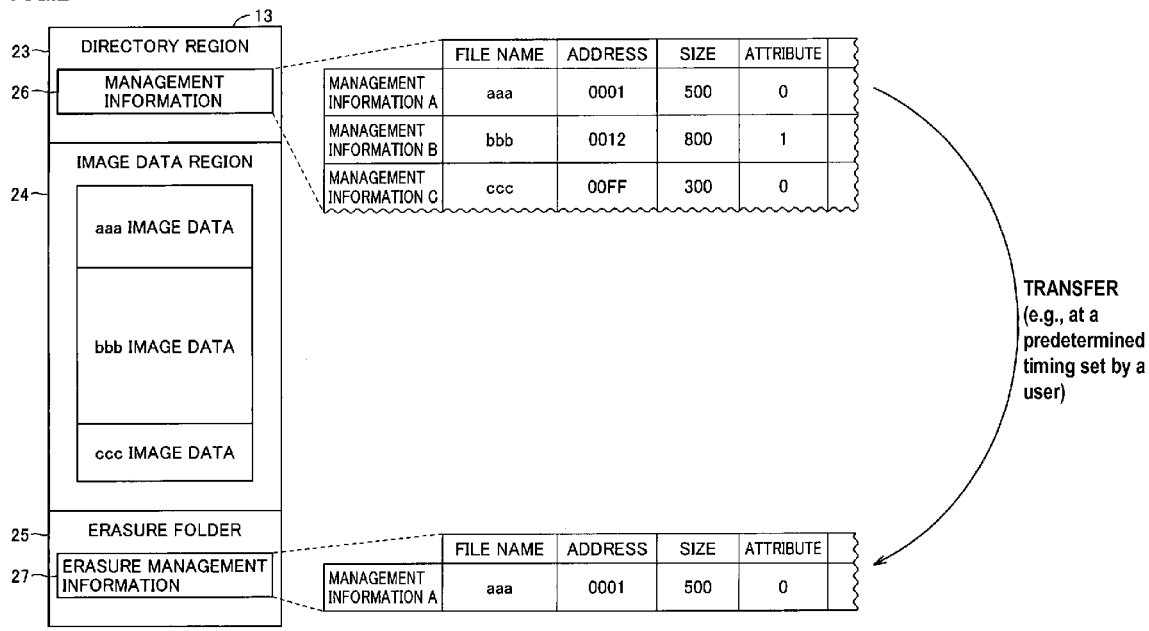
FIG. 2 is a view showing a structure of a storage region of a hard disk 13 in the image forming apparatus according to one embodiment of the present invention.

FIG. 2 is a view showing a constitution of a storage region of the hard disk 13 in the multi functional printer 10. Referring to FIG. 2, the hard disk 13 comprises a directory region 23, an image data region 24 in which the image data is stored, and an erasure folder 25 in its storage region. The directory region 23 contains management information 26 for managing the image data stored in the image data region 24. The erasure folder 25 retains management information for specifying erasable image data (referred to as erasure management information hereinafter).

The management information 26 contains a file name of each image data stored in the image data region 24 or parameters such as an address, a size, an attribute, a state, a created date in the image data region 24 in which the image data is stored, and when contents of the image data stored in the image data region 24 are changed or updated, the contents are reflected in the management information 26.

Figure 3:
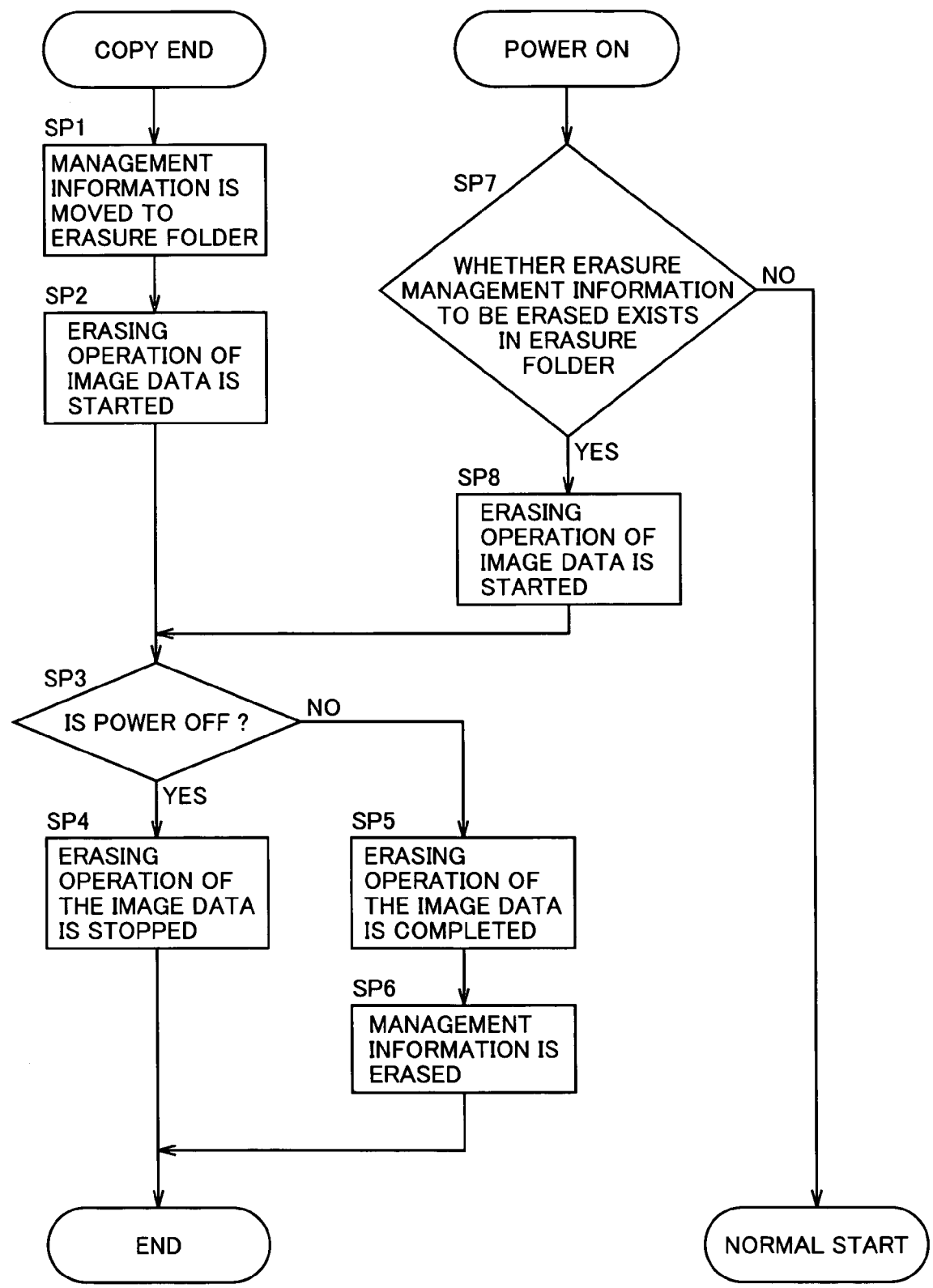
FIG. 3 is a flowchart showing an operation of a control unit when a copying operation is completed and when the power is turned on in the image forming apparatus according to one embodiment of the present invention.

FIG. 3 is a flowchart showing an operation of the control unit 11 when a copying operation is completed and the power is turned on in the multi functional printer 10. First, an operation when the copying operation is completed will be described with reference to FIGS. 2 and 3.

When the copying operation is completed, the control unit 11 erases the copied image data from the hard disk 13. Here, it is assumed that management information of the image data to be erased is management information "A" and its file name is "aaa".

A step (which is designated "SP" in the drawing) SP1, the control unit 11 functions as a moving unit and it moves the management information "A" of the file name "aaa" from the directory region 23 to the erasure folder 25 as shown in FIG. 2.

Then, at step SP2, the control unit 11 functions as an erasing unit and it erases the image data of the file name "aaa" based on the management information "A" in the erasure management information 27 retained in the erasure folder 25. More specifically, the erasing operation includes an overwrite operation in which a certain value or sign is written or a scrambling operation in which a standard pattern is arbitrarily written over the image data of the file name "aaa" corresponding to the management information "A" in the image data region 23. Either operation may be performed.

Then, at step SP3, it is determined whether the power in the multi functional printer 10 is turned off or not. When the power is turned off, the erasing operation of the image data of the file name "aaa" is stopped (SP4). In this case, the image data of the file name "aaa" in a stopped state remains in the image data region 24 and the management information "A" remains in the erasure folder 25.

When the power is not turned off, the erasing operation of the image data of the file name "aaa" is completed at step SP5. Then, at step SP6, the erasure management information "A" is erased. Therefore, as the erasing operation of the image data is completed, the management information "A" does not exist in the erasure folder 25 any more.

Next, an operation when the power of the multi functional printer 10 is turned on will be described. When the power is turned on, the control unit 11 functions as a power supply detecting unit and detects that the power of the multi functional printer 10 is turned on based on a notice from the power supply unit 17. Then, at step SP7, the control unit 11 functions as a determining unit and it determines whether the erasure management information "A" to be erased exists in the erasure folder 25 or not.

When the management information "A" exists in the erasure folder 25, the control unit 11 functions as an erasing unit and erases the image data of the file name "aaa" based on the information of the erasure management information 27 at step SP8.

It is determined whether the power is turned off or not during the erasing operation of the image data similar to the above at the step SP3. Since subsequent operations are the same as the above steps SP4 to SP6, their description will not be reiterated.

Meanwhile, when the management information "A" does not exist in the erasure folder 25 at step SP7, the multi functional printer 10 is normally started.

As described above, according to this embodiment, when the copying operation is completed, all the erasing operation for corresponding copied image data is performed automatically and it is not necessary for the user to request the erasing operation, so that although the nonvolatile storing unit is used, the copied image data can be surely erased.

Although the description has been made of the case where the multi functional printer 10 is used as the copying machine and the image data to be erased is automatically erased when the copying operation is completed, the present invention is not limited to this. That is, in the case the multi functional printer 10 is used as the printer, when the printing operation is completed or in the case the multi functional printer 10 is used as the facsimile machine, when printing of the image data received from the facsimile is completed, the image data used for forming the image may be automatically erased.

In addition, the image data is not always erased after the image is formed based on the image data. For example, the image data may be automatically erased at midnight when the multi functional printer 10 is not used often in general. Thus, the multi functional printer 10 can be efficiently used. In addition, the timing of the automatic erasure may be set by the user.

In addition, the image data may be automatically erased when the copying operation is stopped in the case the multi functional printer 10 is used as the copying machine, or when the printing operation is stopped in the case the multi functional printer 10 is used as the printer, or when the image data stored in a document box and the like is erased, or when the operation while the image data is being stored is stopped. Thus, the image data can be automatically erased not only after the image is formed based on the image data but also when the image data becomes unnecessary.

Next, another embodiment of the present invention will be described. Although the description has been made of the case the image data is automatically erased at a limited timing in the above embodiment, the timing to erase the image data may be determined by the user. That is, it may be inquired whether the erasing operation is performed or not to the user through the display 22 or the personal computer 41. More specifically, at a step before the step SP1 in FIG. 3 at which the image formation such as copying is performed by the instruction of the user, the inquiry may be made on the display 22. Thus, the user can select the image data to be left in the image data region 24 and the image data to be erased.

In addition, although all the parameters which constitute the management information 26 are moved by the moving unit in the embodiment, a parameter to be moved can be previously determined. For example, only the address data of the image data may be moved among the parameters of the management information 26. Thus, an amount of the management information to be moved by the moving unit can be minimum, so that the image data can be immediately erased.

In addition, although the erasure folder is provided and the erasing operation is performed based on the management information retained in the erasure folder in the above embodiment, a parameter such as an erasing operation flag may be provided as a parameter which constitutes the management information 26 instead of the erasure folder and the erasing operation flag may be changed at the above timing and the erasing operation may be performed based on it. Thus, with the erasing operation flag serving as the parameter which manages whether to erase the image data or not, it can be determined whether the image data remains or not.

In addition, together with the management information 26 moved by the moving unit, the erasable image data may be moved to the erasure folder 25. Thus, the image data to be erased from the image data region 24 is further surely erased.

In addition, when the erasing operation is completed, a massage such as "erasing has been completed" may be displayed on the display 22. Thus, the user can confirm that the image data has been surely erased. The display unit may display an image or output a voice to inform the user.

In addition, although one hard disk is provided in the multi functional printer 10 in the above embodiment, two or more hard disks may be provided in the multi functional printer. In this case, one hard disk may comprise the directory region and the image data region and the other hard disk may comprise the erasure folder, so that the storage regions are distributed to the plurality of hard disks.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

What is claimed is:

1. An image forming apparatus having a nonvolatile storing unit for storing image data and forming an image based on the image data stored in said storing unit, comprising:
    an erasure folder for retaining management information which specifies erasable image data among the image data stored in said storing unit;
    a moving unit for moving said management information to said erasure folder;
    an erasing unit for erasing the erasable image data based on said management information;
    a power supply detecting unit for detecting on/off of a power supply of the image forming apparatus;
    a determining unit for determining whether said management information exists in said erasure folder or not when said power supply detecting unit detects that said power is turned on; and
    a control unit for activating said erasing unit when it is determined that said management information exists in said erasure folder by said determining unit.

2. The image forming apparatus according to claim 1, wherein said control unit erases said management information from the erasure folder when the erasing unit erases said erasable image data.

3. The image forming apparatus according to claim 1, wherein said moving unit moves said management information to said erasure folder at a predetermined timing.

4. The image forming apparatus according to claim 3, wherein said predetermined timing can be set by a user.

5. The image forming apparatus according to claim 1, wherein the determining unit determines whether said management information exists in said erasure folder at a time when the image forming apparatus is just started as detected by said power supply detecting unit; and
    the control unit activates said erasing unit at the time when the image forming apparatus is just started, if said determining unit determines that said management information exists in said erasure folder.

* * * * *